(12) United States Patent
Phillips

(10) Patent No.: US 7,742,995 B2
(45) Date of Patent: Jun. 22, 2010

(54) PRE-AUTHENTICATED IDENTIFICATION TOKEN

(75) Inventor: Simon Phillips, York (GB)

(73) Assignee: Mastercard International, Inc., Purchase, NY (US)

( * ) Notice: Subject to any disclaimer, the term of this patent is extended or adjusted under 35 U.S.C. 154(b) by 196 days.

(21) Appl. No.: 11/728,224

(22) Filed: Mar. 23, 2007

(65) Prior Publication Data

US 2008/0235144 A1 Sep. 25, 2008

(51) Int. Cl.
*G06Q 20/00* (2006.01)

(52) U.S. Cl. .................. 705/65; 705/76; 340/573.1; 340/686.1; 340/686.6; 455/41.2

(58) Field of Classification Search ............. None
See application file for complete search history.

(56) References Cited

U.S. PATENT DOCUMENTS

| 4,529,870 | A | | 7/1985 | Chaum |
| 5,721,781 | A | | 2/1998 | Deo et al. |
| 5,959,287 | A | * | 9/1999 | Myers et al. ............ 235/472.02 |
| 6,168,077 | B1 | * | 1/2001 | Gray et al. ................... 235/375 |
| 6,250,557 | B1 | | 6/2001 | Forslund et al. |
| 6,510,236 | B1 | * | 1/2003 | Crane et al. ................. 382/116 |
| 6,774,796 | B2 | * | 8/2004 | Smith ...................... 340/573.1 |
| 6,778,066 | B2 | * | 8/2004 | Smith ........................ 340/5.61 |
| 6,863,220 | B2 | | 3/2005 | Selker |
| 6,957,771 | B2 | * | 10/2005 | Norris, Jr. ................... 235/382 |
| 6,983,882 | B2 | | 1/2006 | Cassone |
| 7,048,183 | B2 | * | 5/2006 | Coughlin et al. ............ 235/382 |

* cited by examiner

*Primary Examiner*—Calvin L Hewitt, II
*Assistant Examiner*—Tsan-Yu J Huang
(74) *Attorney, Agent, or Firm*—Buckley, Maschoff & Talwalkar LLC

(57) ABSTRACT

An identification token such as a proximity payment device may be integrated with a wristwatch. For security purposes, the identification token may be disabled when removed from the user's wrist. The identification token may be re-enabled by interaction with a docking station or personal computer at the user's residence.

19 Claims, 10 Drawing Sheets

PRE-AUTHENTICATED IDENTIFICATION TOKEN

BACKGROUND

Typical American adults carry a number of cards on their persons to identify themselves for various purposes. One very common type of identification card is a payment card such as a credit or debit card. Traditionally, payment cards have carried a magnetic stripe from which a point of sale terminal may read data such as the account number of a payment account to be accessed with the payment card. More recently, it has been increasingly common for payment cards to be embodied as contactless smart cards. Payment cards in this form are able to communicate the payment card account by wireless data transmission to a proximity reader that is part of or is interfaced to the point of sale terminal. The same functionality may be provided in devices—such as key fobs—that are not shaped like a conventional payment card.

For relatively small transactions, it is now often the case that presentation of the payment card/device is all that is required for the transaction to go forward. However, for larger transactions, an additional layer of security may be interposed by requiring the cardholder to provide his/her signature or to enter a personal identification number (PIN).

U.S. Pat. No. 6,957,771, issued to Norris, discloses a wristwatch that may also incorporate functions like those of a contactless smart card payment card. The payment device/wristwatch disclosed in Norris provides enhanced security in that for the device to function it must be authenticated by entry therein of a PIN or by the device detecting a biometric characteristic of the wearer. If configured for authentication by entry of a PIN, the Norris device may retain its authenticated state for a period of time and/or until removed from the wearer's wrist.

One drawback of Norris's device is that it appears to require either a keypad to allow PIN entry or a biometric sensor or both. These requirements would tend to increase the size, cost and complexity of the device.

BRIEF DESCRIPTION OF THE DRAWINGS

Features and advantages of some embodiments of the present invention, and the manner in which the same are accomplished, will become more readily apparent upon consideration of the following detailed description of the invention taken in conjunction with the accompanying drawings, which illustrate preferred and exemplary embodiments and which are not necessarily drawn to scale, wherein.

DETAILED DESCRIPTION

Figure 1:
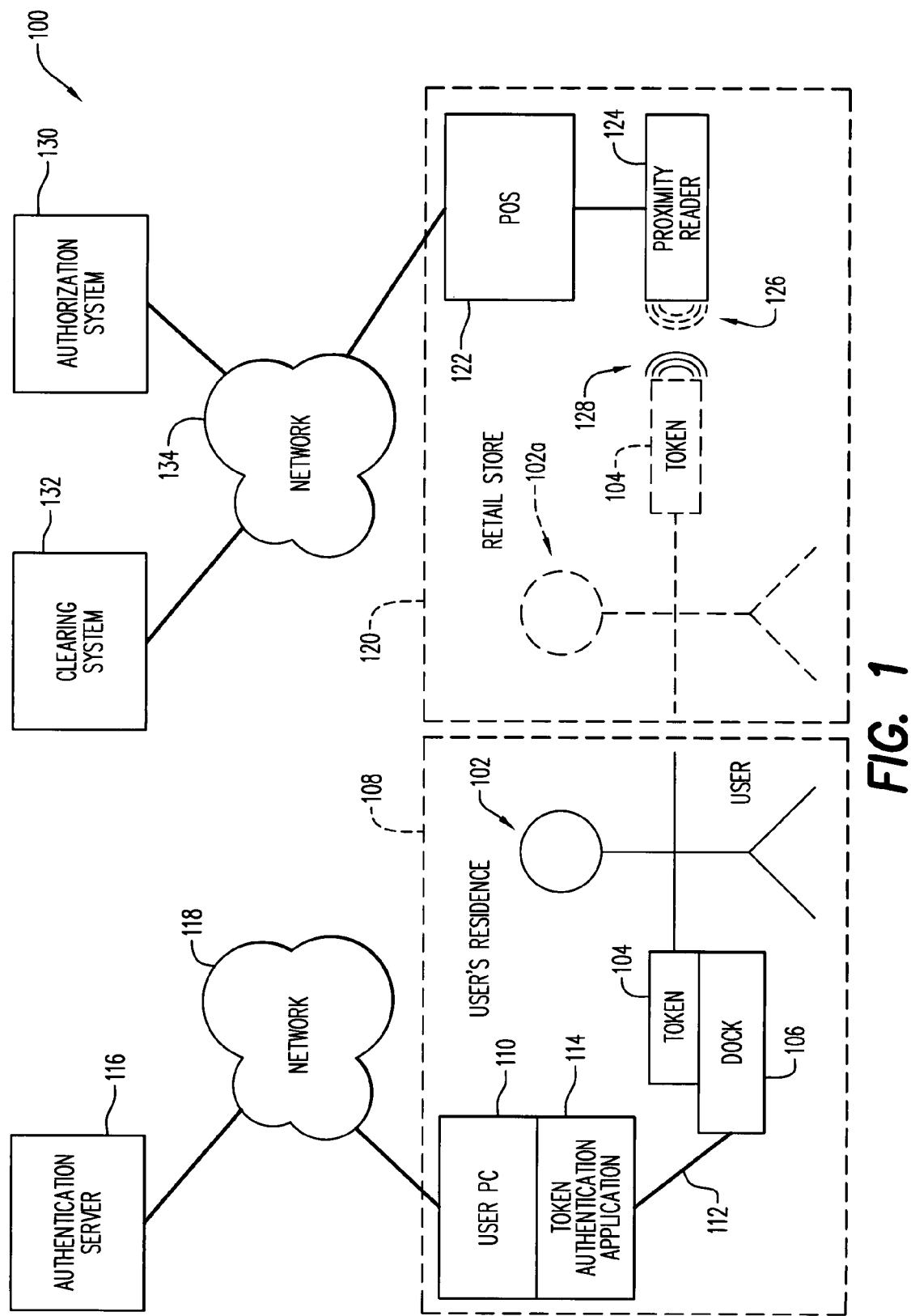
FIG. 1 is a simplified block diagram that illustrates a payment system, provided in accordance with aspects of the invention, and operation of the payment system.

In general, and for the purpose of introducing concepts of embodiments of the present invention, a proximity payment device is embodied as a wristwatch. In addition to conventional proximity payment device operation, the wristwatch provides enhanced security by being pre-authenticated as a level of assurance that the individual presenting the wristwatch for a purchase transaction is the person who is authorized to possess and use the wristwatch. The wristwatch may be conveniently and automatically placed in its pre-authenticated condition by interaction with a docking station that is located at the authorized user's residence and thus is under the authorized user's control. The wristwatch may remain in its pre-authenticated condition so long as it remains on the user's wrist but may spontaneously exit from the pre-authenticated condition upon the wristwatch detecting that it has been removed from the user's wrist. This may help to guard against unauthorized use of the wristwatch after loss or theft.

The docking station may be in communication with a personal computer at the user's residence. The personal computer may communicate with a server computer that is operated by the issuer of the payment account that is accessible by use of the wristwatch. Through the intermediary activity of the personal computer, the server computer may provide a signal to condition the docking station to operate for the purpose of placing the wristwatch in its pre-authenticated condition. Thus data communication between the user's personal computer and the issuer's server may function to secure operation of the docking station, which in turn functions to secure operation of the wristwatch as a proximity payment device. The interaction between the user's personal computer and the issuer's server may occur only as part of a set-up operation and thereafter only on periodic occasions, so that the daily pre-authentication of the wristwatch by the docking station may require only minimal effort on the part of the user. The wristwatch need not include a keypad for entry of a PIN or the like and thus may be similar in size and cost to a conventional wristwatch that also functions as a proximity payment device.

In some respects, operation of the wristwatch in performing a purchase transaction may be like that of a conventional proximity payment device. In other respects, and in some embodiments, the pre-authenticated nature of the wristwatch and/or other capabilities optionally included therein may allow for certain privileges or advantages in connection with purchase transactions.

At the outset it should also be observed, as will be elaborated on below, that the proximity payment device described herein need not necessarily be a wristwatch and that the payment system operations described herein are merely exemplary of other identification applications which may be implemented using identification tokens that incorporate security features like those of the proximity payment device described herein.

FIG. 1 is a simplified block diagram that illustrates a payment system 100, provided in accordance with aspects of the invention, and operation of the payment system 100. A user of the payment system 100 is depicted at 102. The user 102 is the authorized holder of an identification token 104. The identification token 104 may be embodied as a wristwatch that can function as a proximity payment device. The identification token 104 may be considered to be a functional component of the payment system 100. Details of the identification token 104 will be described below in conjunction with FIG. 2. At least with respect to its proximity payment device aspects, the identification token 104 may have been issued to the user 102 by an issuing financial institution (hereinafter the "issuer"). The issuer may maintain a payment account in the name of the user 102. The payment account may be a credit card account or a debit card account. The payment account may be accessible to the user 102 for purchase transactions by presentation of the identification token 104.

Continuing to refer to FIG. 1, a docking station 106 (which may also be referred to as a "dock") is installed in the residence 108 of the user 102. It may be the user's practice to place the identification token 104 on the docking station 106 when the user removes the identification token from her/his wrist at the end of each day. Accordingly, FIG. 1 depicts the identification token 104 being deposited on the docking station 106 by the user 102. (In an alternative interpretation of FIG. 1, it may be considered that the user 102 is depicted as taking up the identification token 104 from the docking station 106 at the beginning of the day.)

The docking station 106 may have been provided to the user 102 by the issuer. Details of the docking station 106 will be described below in conjunction with FIG. 3. The docking station 106 may be considered to be a functional component of the payment system 100.

A personal computer 110 is present in the user's residence 108. The personal computer 110 may be conventional in its hardware aspects and may be programmed with software to provide conventional functions of a personal computer, including interaction with the Internet. The user 108 may from time-to-time utilize the personal computer 110 for one or more conventional home computer functions. The personal computer 110 may in addition or alternatively be utilized for home-office purposes.

As indicated at 112, the personal computer 110 may be linked to the docking station 106 (at least from time to time) by a data communication channel. The data communication channel 112 between the personal computer 110 and the docking station 106 may be implemented wirelessly or by cable or by domestic power circuitry or by any conventional technology.

The personal computer 110 may store and be controlled by conventional software programs including for example an operating system and a browser. In addition, the personal computer 110 may store an application program 114 that controls operation of the personal computer 110 in connection with the personal computer's participation in the payment system 100. Accordingly, the application program 114 may control operation of the personal computer 110 at least from time to time. Details of the manner in which the application program 114 controls the personal computer 110 will be described below. Suffice it to say for the moment that the application program 114 may control the personal computer 110 in connection with interaction between the personal computer 110 and the docking station 106. From one point of view, the docking station 106 may be regarded as a peripheral component for the personal computer 110, and the application program may function at least in part as a software driver for the docking station 106.

In another aspect, the application program 114 may at least partially control interaction between the personal computer 110 and an authentication server computer 116. The authentication server computer 116 may be operated by or on behalf of the issuer to manage authentication, via user PCs, of identification tokens (such as identification token 104) that are deployed in connection with the payment system 100. The personal computer 110 may engage in data communication, on at least one occasion or from time to time, with the authentication server computer 116 via a data communication network 118. The data communication network 118 may be the Internet, for example. The authentication server computer 116 and the personal computer 110 (at least in regard to the application program 114) may be considered functional components of the payment system 100.

Reference numeral 120 indicates a retail store. The user shown at 102 is depicted again in phantom at 102a as being present in the retail store 120. It is assumed that the user as depicted at 102a has visited the retail store 120 while wearing the identification token 104 (also shown in phantom in the retail store 120) on her/his wrist. It is also assumed that the identification token 104 is in an authenticated condition, having been placed in that condition through interaction with the docking station 106. The user as depicted at 102a is shown engaging in a purchase transaction at a POS terminal 122 that is installed in retail store 120. The POS terminal 122 includes and/or is interfaced to a proximity reader 124. The proximity reader 124 may be of the type conventionally employed to read proximity payment devices such as contactless payment smart cards. For example, the proximity reader 124 may operate, at least in some aspects, in accordance with the well-known PayPass standard promulgated by MasterCard International Incorporated, which is the assignee hereof.

An exchange of wireless RF communications between the proximity reader 124 and the identification token 104 is schematically represented in FIG. 1 by an interrogation signal 126 from the proximity reader 124 and an answering signal 128 from the identification token 104. The answering signal 128 may include the payment account number of the account which belongs to the user 102/102a. Those who are skilled in the art will recognize that in practice there may be several rounds of wireless communication back-and-forth between the proximity reader 124 and the identification token 104 to consummate the purchase transaction by communicating the user's payment account number to the POS terminal 122 via the proximity reader 124. In accordance with one conventional scenario, all the required communication between the proximity reader 124 and the identification token 104 may be accomplished during a moment in which the user as depicted at 102a taps the identification token 104 on the proximity reader 124. In one aspect, it may be considered that the user as indicated at 102a has effectively used the identification token 104 to identify herself/himself to the retail store 120/POS terminal 122 for purposes of the purchase transaction.

In accordance with conventional practices, the POS terminal 122 may be in direct or indirect data communication with a transaction authorization system 130 and a transaction clearing system 132. One or more data communication networks (indicated at 134) may be provided to permit the transmission of messages required for transaction authorization and clearing. In many instances, a merchant processing system, which is not shown, is interposed between the POS terminal 122 and the communication network(s) 134. To briefly summarize conventional practices, a request to authorize the purchase transaction may be transmitted from the POS terminal 122 through the transaction authorization system 130 to the authorization server (not separately shown) that is operated by or on behalf of the issuer. The authorization request typically includes the user's payment account number as supplied by the identification token 104, the dollar amount of the transaction, and other data related to the transaction. An authorization response is then transmitted from the issuer's authorization server through the transaction authorization system 130 to the POS terminal 122. Thereafter, typically as part of an overnight batch process, the retail store submits the purchase transaction for clearing and settlement via the transaction clearing system 132.

In some embodiments, the transaction clearing system 132 and the transaction authorization system 130 may at least partially overlap. Also, the data communication networks 118 and 134, shown as separate in FIG. 1, may be combined or may at least partially overlap.

The POS terminal 122, the proximity reader 124, the transaction authorization system 130, and the transaction clearing system 132 may all be considered to be functional components of the payment system 100.

Although only one user, one identification token, one docking station, one user PC, one retail store, one POS terminal and one proximity reader are explicitly shown in FIG. 1, in practice the payment system 100 may serve many users/payment account holders and many retail stores, so that the payment system 100 may include many arrangements like that shown at 108, collectively including many identification tokens (each issued to a respective user and used to access a respective payment account) and many docking stations (each interfaced to a respective user PC). Moreover, each retail store may have a number (several, dozens, even hundreds) of POS terminals and proximity readers, and there may be a very large number of retail stores having such installations included in the payment system 100. It should also be understood that there may be more than one user residing in a particular residence, so that a given residence may have more than one docking station, each to authenticate a respective identification token issued to a respective user, all of which docking stations, in some cases, being interfaced to a single user PC shared by all resident account holders.

Figure 2:
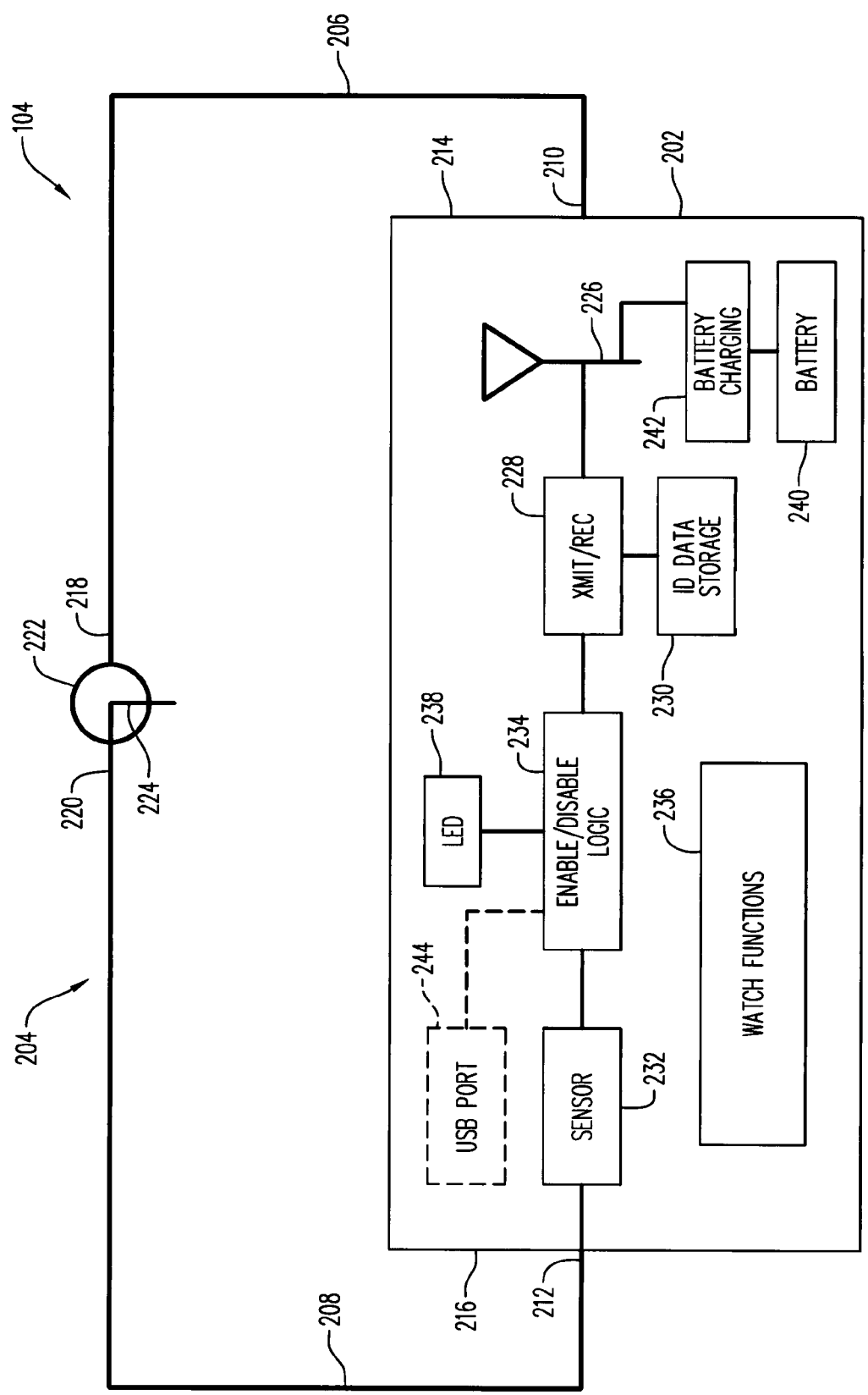
FIG. 2 is a block diagram of an identification token, which is provided in accordance with aspects of the invention and functions as a proximity payment device in the system of FIG. 1.

FIG. 2 is a block diagram of an example embodiment of the identification token 104.

The identification token 104 includes a housing 202. The housing 202 may resemble, in many or all ways, a conventional wristwatch case. The identification token 104 also includes a wristband 204 that is secured to the housing 202. A function of the wristband 204 is to removably secure the housing 202 to the user's wrist (not shown). In the example embodiment shown in FIG. 2, the wristband may include two strap members 206, 208. Each strap member may include a proximal end 210 or 212 secured to the housing 202. For example, the strap members 206, 208 may be secured to opposite ends 214, 216 of the housing 202. Each strap member also has a distal end 218 or 220. The distal ends each carry a respective clasp portion 222 or 224 (clasp portions schematically indicated in FIG. 2) configured to be releasably coupled to the other clasp portion to hold the wristband in a closed condition around the user's wrist.

The identification token 104 may further include an antenna 226 disposed in and/or on the housing 202. The antenna 226 may, for example, be of a type that is suitable for exchanging communications with the proximity reader 124 in accordance with the above-referenced PayPass standard. The identification token 104 may also include circuitry—such as a transmit/receive circuit 228 and an identification data storage circuit 230 which is coupled to the transmit/receive circuit 228—to implement conventional proximity payment device functionality. The transmit/receive circuit 228 may be coupled to the antenna 226 to receive interrogation signals and/or other signals from the proximity reader 124 and to transmit to the proximity reader 124 identification data such as a payment account number stored in the identification data storage circuit 230. Although the transmit/receive circuit 228 and the identification data storage circuit 230 are depicted as separate blocks, in practice these circuits may be included in a single integrated circuit, which is not separately shown.

In addition, the identification token 104 may include a sensor 232. The sensor 232 may be coupled to the wristband 204 in such a manner that the sensor is able to detect whether or not the clasp portions 222, 224 are coupled to each other. For example, coupling of the clasp portions 222, 224 to each other may complete an electrically conductive circuit through the strap members 206, 208 and the housing 202, and the sensor 232 may be coupled to detect whether that conductive circuit is open or is complete. In effect the sensor 232 may sense the state of such a circuit as a proxy for detecting whether the identification token 104 and its housing 202 are secured to or removed from the user's wrist. (It may be the case that some of the circuitry associated with the sensor 232 is not depicted in the drawing. For example, there may a conductive path—which is not shown—between the sensor 232 and the wristband strap member 206.)

The identification token 104 may further include enable/disable logic circuit 234, coupled to the sensor 232 and to the transmit/receive circuit 228. The enable/disable logic circuit 234 may be provided in accordance with aspects of the invention. Operation of the enable/disable logic circuit 234 is described below. Briefly, however, the enable/disable logic circuit 234 functions to disable or enable the identification token 104, respectively, pursuant to removal of the identification token 104 from the user's wrist or authentication of the identification token 104 by the docking station 106. The enable/disable logic circuit 234 is shown as separate from the transmit/receive circuit 228 and the identification data storage circuit 230, but in practice may be integrated with either or both of the transmit/receive circuit 228 and the identification data storage circuit 230. Each of the elements 226, 228, 230, 232, 234 may be contained in and/or mounted on the housing 202 of the identification token 104.

In some embodiments some or all of the circuit blocks 228, 230, 234 may be carried on a SIM-style small smart card (not separately shown) which is installed in the housing 202 to implant the proximity payment functionality into what would otherwise essentially be a wristwatch. This may generally be done, for example, in accordance with the teachings of provisional patent application Ser. No. 60/843,044, filed Sep. 8, 2006. (The '044 provisional application has a common inventor with, and is commonly owned with, this application, and is incorporated herein by reference, but benefit of priority is not claimed herein with respect to the '044 provisional application.)

Still further, the identification token 104 may include hardware and/or software and/or firmware to allow the identification token 104 to function as a conventional wristwatch. Such hardware/software and/or firmware is schematically represented by block 236 in FIG. 2, and may include analog watch hands (hour/minute/second) and/or a digital watch display, along with electrical and/or electronic circuitry to drive the watch hands and/or digital watch display.

The identification token 104 also may include an indicator, such as light-emitting diode 238, coupled to the enable/disable logic circuit 234. The function of the LED 238 is to indicate to the user whether the identification token 104 is in an enabled condition.

In addition, the identification token 104 includes a battery 240 to power at least some of the functions of the identification token 104. Power distribution circuitry is also present (though not shown in the drawing) to distribute power from the battery 240 to at least some of the various electronic and electrical components of the identification token 104. In some embodiments, the battery 240 is rechargeable, and the identification token 104 also includes a battery charging circuit 242. The battery charging circuit 242 is coupled between the antenna 226 and the battery 240 such that, when the identification token 104 is on the docking station 106, the battery charging circuit 242 receives a power signal from the docking station 106 via the antenna 226 and applies the power signal to charge the battery 240.

In some embodiments, the identification token 104 may exchange wireless communications with the docking station 106 via the antenna 240. In some arrangements, the identification token 104 may be in data communication with the personal computer 110 via the antenna 240 and the docking station 106. However, according to some alternative embodiments of the payment system 100, the docking station 106 may be dispensed with, or may lack any communication function and may be used only to charge the battery 240 of the identification token 104. In such embodiments, the identification token 104 may include a USB port 244 (shown in phantom in FIG. 2). The USB port may be mounted on the housing 202 of the identification token 104 and may be coupled to the enable/disable logic circuit 234 to permit exchange of data communications directly between the enable/disable logic circuit 234 and the personal computer 110 via a USB connection (not shown) set up from time-to-time between the identification token 104 and the personal computer 110.

Figure 3:
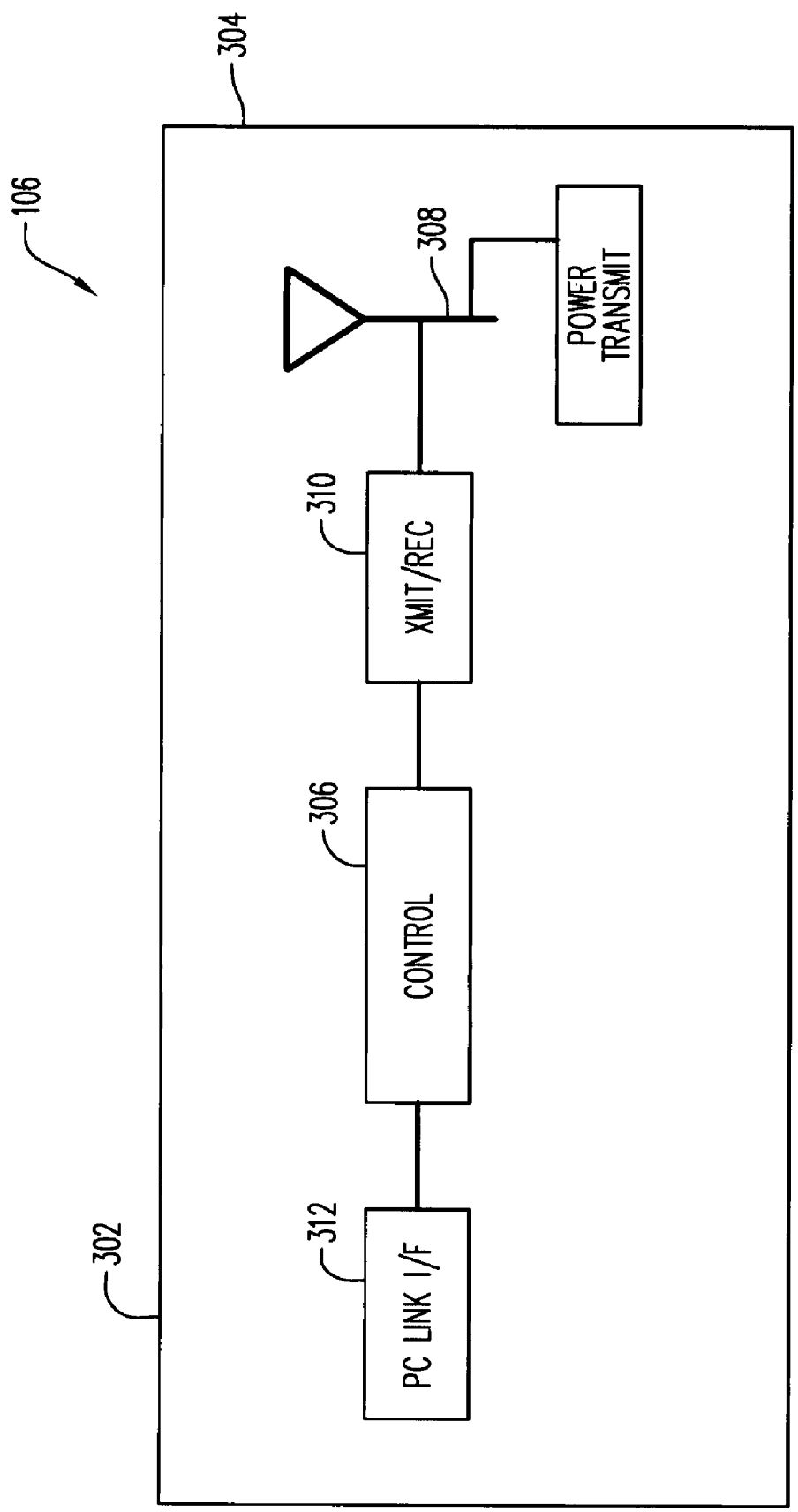
FIG. 3 is a simplified block diagram of a docking station which is provided in accordance with aspects of the invention for operation with the identification token of FIG. 2 in the system of FIG. 1.

FIG. 3 is a simplified block diagram of the docking station 106. The docking station 106 may be somewhat similar to a conventional proximity reader in that the docking station 106 may be configured to communicate wirelessly with the identification token 104.

The docking station 106 includes a housing 302 which contains other components of the docking station 106. The housing 302 may have a top surface 304 on which the user may place the identification token 104 when the user removes the identification token 104 from his/her wrist at the end of the day.

The docking station 106 may also include control circuitry 306 which is mounted inside the housing 302 (e.g., on a circuit board which is not separately shown). The control circuitry 306 may control over-all operation of the docking station 106, including communications between the docking station 106 and other devices (such as the personal computer 110 and the identification token 104). The control circuitry 306 may encompass, for example, a conventional microprocessor or microcontroller (not separately shown) and associated program and/or working memory devices (also not separately shown).

Further, the docking station 106 may include an antenna 308 mounted in and/or on the housing 302. The antenna 308 may be used to exchange wireless data communications with the identification token 104 and/or to transmit a power signal to the identification token 104. The power signal may, as noted above, be received by the identification token 104 to charge the battery in the identification token 104. (In some embodiments, the battery charging capabilities of the docking station 106 may be omitted. In some embodiments, the docking station may operate as a proximity reader interfaced to the PC 110.)

The docking station 106 may further include a transmit/receive circuit 310. The transmit/receive circuit 310 may be coupled between the control circuitry 306 and the antenna 308 to handle data communications between the docking station 106 and the identification token 104.

In addition, the docking station 106 may include an interface 312 for the data communication channel 112 (FIG. 1) between the docking station 106 and the personal computer 110 (FIG. 1). The interface 312 may be coupled to the control circuitry 306 to allow the control circuitry 306 of the docking station 106 to engage in data communications with the personal computer 110.

Figure 4:
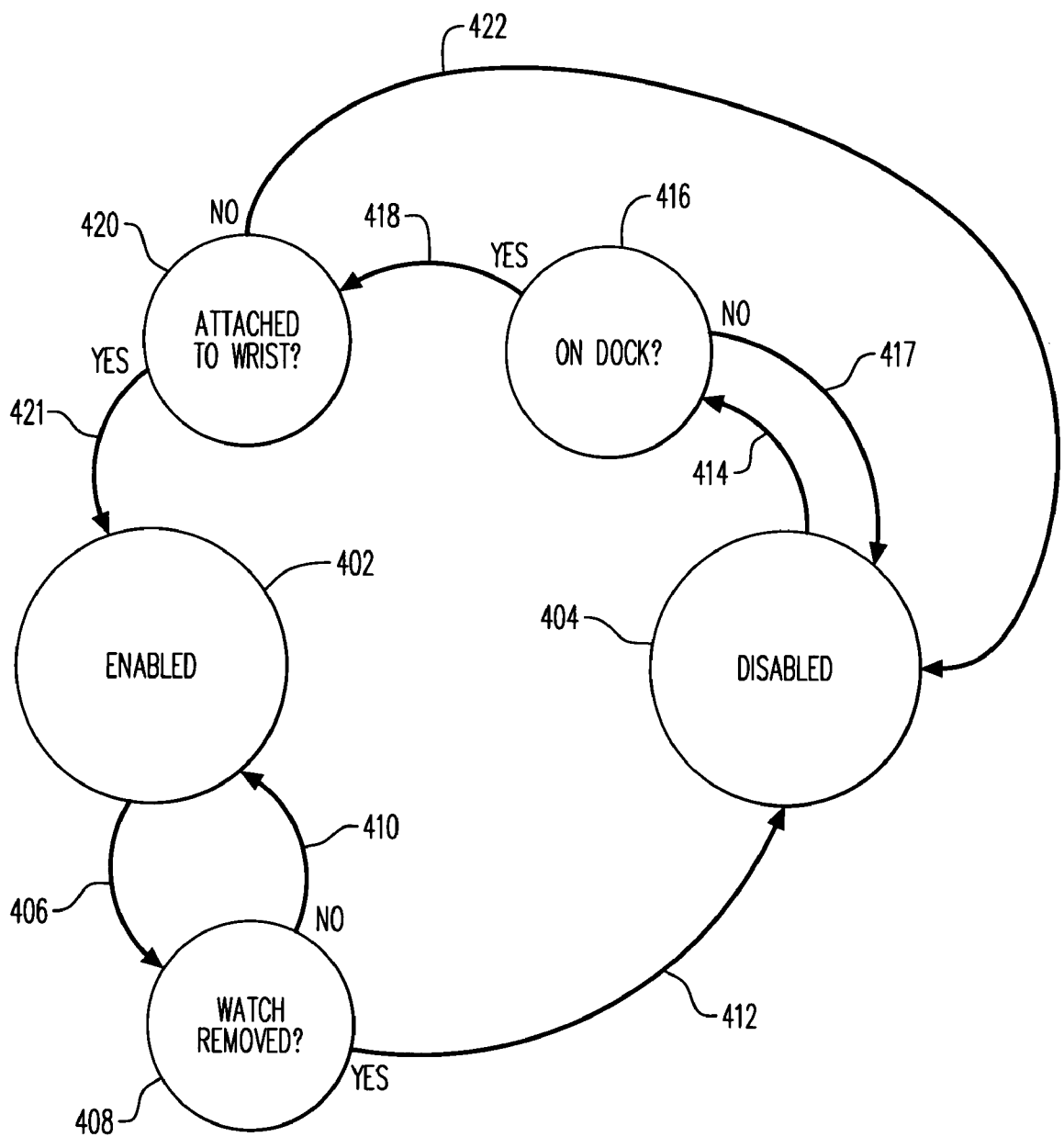
FIG. 4 is a state diagram that illustrates operation of the identification token of FIG. 2 in accordance with some embodiments.

FIG. 4 is a state diagram that illustrates operation of the identification token 104 in accordance with some embodiments. The state transitions illustrated in FIG. 4 may be implemented by the enable/disable logic circuit 234 (FIG. 2) of the identification token 104. In accordance with the embodiments of FIG. 4, the identification token 104 is always in either (but not both simultaneously) an enabled state 402 or a disabled state 404. The enabled state 402 may be defined as a state in which the identification token 104, if properly presented to a suitable and operative proximity reader, will engage in communications with the proximity reader in which the identification token 104 transmits the user's payment account number and/or other identifying information to the proximity reader. The term "properly presented" refers to placing the identification token 104 in proximity to the proximity reader and, if necessary, actuating an "on" switch (discussed below) at the same time or shortly prior to placing the identification token 104 in proximity to the proximity reader.

The disabled state 404 is defined as not being in the enabled state 402.

As indicated at 406, 408, when the identification token 104 is in the enabled state 402, the enable/disable logic circuit 234 continuously monitors the sensor 232 to determine whether the sensor 232 has detected that the identification token 104 has been removed from the user's wrist. If removal of the identification token 104 from the user's wrist is not detected, then the identification token 104 remains in the enabled state 402, as indicated at 410. If removal of the identification token 104 from the user's wrist is detected, then the identification token 104 transitions, as indicated at 412, from the enabled state to the disabled state.

From the previous discussion of the wristband 204 and the sensor 232 in conjunction with FIG. 2, it will be appreciated that, in some embodiments of the identification token 104, removal of the identification token 104 from the user's wrist may be detected by detecting that the clasp portions 222, 224 have been uncoupled from each other. However, in alternative embodiments of the identification token 104, other techniques may be employed for detecting removal of the identification token 104 from the user's wrist. For example, in some embodiments the identification token 104 may have a bracelet-style wristband instead of the strap-style wristband described with reference to FIG. 2. The former type of wristband may have one or more elastic elements such that, when the wristband is on the user's wrist, the wristband is in some degree of tension, whereas the wristband is in a relaxed state when the identification token 104 is not on the user's wrist. Accordingly, the identification token 104 in such embodiments may for example include a sensor that incorporates a strain gauge to detect whether or not the wristband is in tension to determine whether or not the identification token 104 is on the user's wrist.

In cases where the wristband of the identification token 104 has a hinged element that must be closed to hold the wristband on the user's wrist, the sensor may detect whether the hinged element is open or closed.

According to other techniques that may be employed, the identification token 104 may include a sensor to detect whether or not the housing 202 is adjacent to the user's wrist. For example, a pulse monitor may be employed for this purpose. Other types of monitors or sensors that may be used for this purpose include a capacitance sensor, an ultrasonic Doppler blood flow monitor, a pressure sensor (to detect whether the housing 202 is pressed against the user), a heat sensor (to detect the user's body heat) or an electrical conduction sensor.

Referring again to FIG. 4, and as indicated at 414, 416, when the identification token 104 is in the disabled state 404, the enable/disable logic circuit 234 is operative to determine whether the identification token 104 is receiving a signal from the docking station 106 to re-authenticate the identification token 104. If not, then as indicated at 417 the identification token 104 remains in the disabled state 404. However, if the re-authentication signal is received by the identification token 104, then as indicated at 418, 420, the enable/disable logic circuit 234 determines whether the sensor 232 is indicating that the identification token 104 is attached to the user's wrist. (In alternative embodiments, the enable/disable logic circuit 234 determines at 420 whether the identification token 104 is attached to the user's wrist within a predetermined (e.g., brief) time after the re-authentication signal is received.) If at 420 the sensor 232/enable/disable logic circuit 234 detect reattachment of the identification token 104 to the user's wrist, then the identification token 104 transitions (as indicated at 421) to the enabled state 402. If at 420 reattachment of the identification token 104 to the user's wrist is not detected, then the identification token 104 remains (as indicated at 422) in the disabled state 404.

Figure 5:
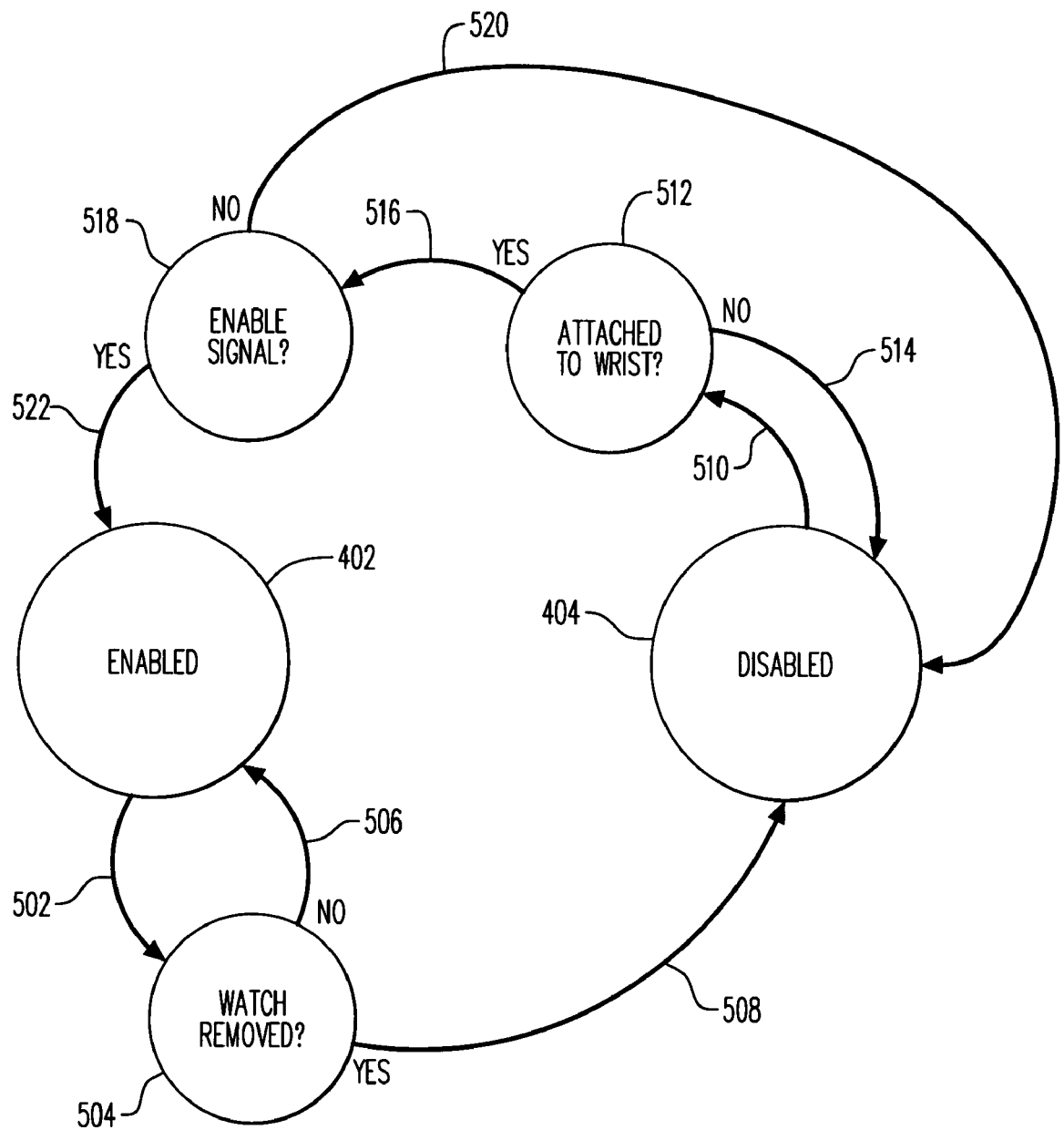
FIG. 5 is a state diagram that illustrates operation of the identification token of FIG. 2 in accordance with some other embodiments.

FIG. 5 is a state diagram that illustrates operation of the identification token 104 in accordance with some other embodiments. As in the embodiments represented by FIG. 4, the identification token 104 is always in either (but not both simultaneously) an enabled state 402 or a disabled state 404. These two states are defined in the same manner as was described above in connection with FIG. 4.

Referring then to FIG. 5, and as indicated at 502, 504, when the identification token 104 is in the enabled state 402, the enable/disable logic circuit 234 continuously monitors the sensor 232 to determine whether the sensor 232 has detected that the identification token 104 has been removed from the user's wrist. If removal of the identification token 104 from the user's wrist is not detected, then the identification token 104 remains in the enabled state 402, as indicated at 506. If removal of the identification token 104 from the user's wrist is detected, then the identification token 104 transitions, as indicated at 508, from the enabled state to the disabled state.

As indicated at 510, 512, when the identification token 104 is in the disabled state 404, the enable/disable logic circuit 234 is operative to determine whether the sensor 232 is indicating that the identification token 104 is attached to the user's wrist. If not, then as indicated at 514, the identification token 104 remains in the disabled state 404. However, if at 512 the enable/disable logic circuit 234 determines that the sensor 232 is indicating that the identification token 104 is attached to the user's wrist, then as indicated at 516, 518 the enable/disable logic circuit 234 determines whether the identification token 104 is receiving a signal from the docking station 106 to re-authenticate the identification token 104. If not, then as indicated at 520 the identification token 104 remains in the disabled state 404. However, if at 518 the enable/disable logic circuit 234 determines that the identification token 104 is receiving the re-authentication signal, then as indicated at 522 the identification token 104 transitions to the enabled state 402.

In some embodiments, the docking station 106 is not provided, or serves only to charge the battery in the identification token 104. In such cases, the enable/disable logic circuit 234 may receive a re-authentication signal from the personal computer 110 (FIG. 1) via a data communication channel between the personal computer 110 and the identification token 104 (e.g., via a USB port 244, FIG. 2, or via a proximity read/write device coupled to the PC 110).

Figure 6:
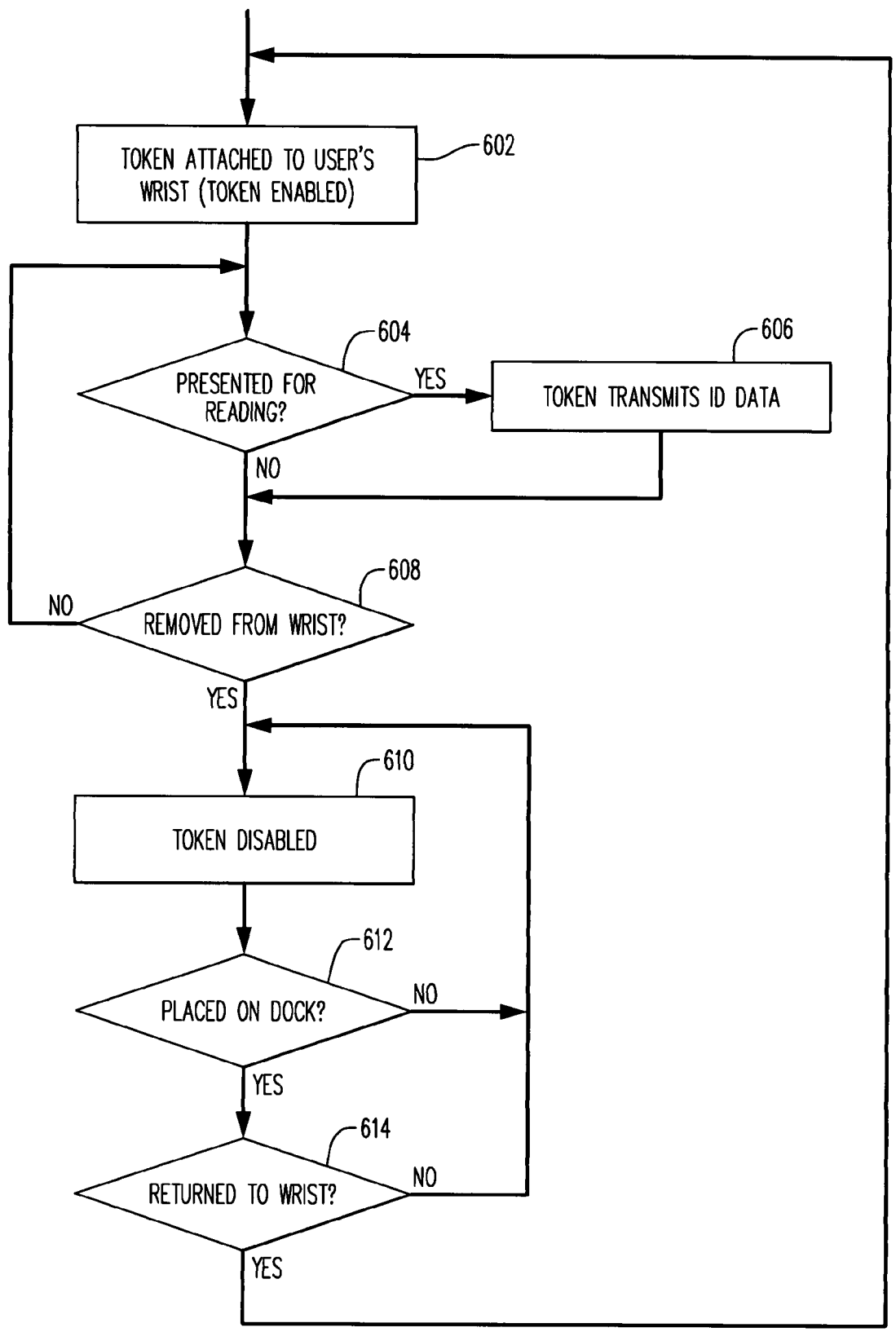
FIG. 6 is a flow chart that illustrates a process for using the identification token of FIG. 2 in accordance with some embodiments.

The state diagrams of FIGS. 4 and 5 illustrate aspects of operation of the identification token 104 in terms of internal processes of the identification token 104; by contrast, FIG. 6 is a flow chart that illustrates aspects of operation of the identification token 104 from the point of view of the user.

At 602 in FIG. 6, the identification token 104 is in its normal condition for use—i.e., in the enabled state and secured to the user's wrist. At decision block 604, the identification token 104 determines whether it has been presented for reading by the proximity reader of a POS terminal. In some embodiments of the identification token 104, presenting the identification token 104 for reading only requires that it be tapped on, or otherwise brought very close, to the proximity reader. However, certain security considerations may call for the identification token 104 to include a user-actuatable "on" switch. (As discussed in U.S. Pat. No. 6,863,220, issued to Selker, if a proximity payment device were always "on", there may be a risk of surreptitious reading of the account number by a wrong-doer even while the device remains in the authorized user's possession. To parry this threat, the proximity payment device may normally be "off" and therefore unreadable, and may be switchable to an "on" state by actuation of a manually-actuatable switch on the device at the time when the device is being presented for reading by a proximity reader at a POS terminal.) For example, the identification token 104 may include an "on" switch (not shown) that provides a signal to the transmit/receive circuit 228 (FIG. 2) or to a control circuit (not separately shown) associated with the transmit/receive circuit 228 to allow the identification token 104 to be read by the proximity reader. When the user presents the identification token 104 for reading by the proximity reader 124 (FIG. 1), he/she may actuate the "on" switch while tapping the identification token 104 on the proximity reader 124. According to another arrangement, and as described in provisional patent application Ser. No. 60/878,989 (filed Jan. 5, 2007, commonly owned herewith, having a common inventor herewith, and incorporated herein by reference; benefit of the filing date of the '989 provisional application is not claimed for this application), actuating the "on" switch may cause the identification token 104 (assuming it is in the enabled state) to be readable by the proximity reader 124 for a certain period of time after actuation of the "on" switch. Hence presenting the identification token 104 to the proximity reader may be a simple two-step process: (1) pressing the "on" switch with a finger on the hand that is opposite to the wrist which bears the identification token 104; and (2) then tapping the identification token 104 on the proximity reader. This arrangement allows the user to avoid an awkward two-handed maneuver in which the user taps the identification token 104 on the proximity reader while at the same time pressing the "on" switch with her/his other hand.

In any event, if at decision block 604 the identification token 104 is presented for reading to the proximity reader 124, then (as indicated at 606 in FIG. 6) the identification token 104 transmits, to the proximity reader 124 and thus to the POS terminal 122, identification data such as the user's payment account number.

A decision block 608 is also in a processing loop with decision block 604. At decision block 608, the identification token 104 determines whether it has been removed from the user's wrist. If so, the process of FIG. 6 breaks out of the loop 604-608 and the identification token 104 is disabled, as indicated at 610.

Once the identification token 104 is disabled, the process of FIG. 6 enters a loop that includes decision blocks 612 and 614. At decision block 612 it is determined whether the identification token 104 has been placed on the docking station 106. At decision block 614 it is determined whether the identification token 104 has again been secured to the user's wrist. Until a positive determination has been made at both decision blocks 612, 614 (e.g., both within a certain time window or, in some embodiments, simultaneously), the process remains within the loop 610-614 and the identification token 104 remains disabled. Once both conditions expressed in decision blocks 612, 614 have been satisfied (e.g., within a requisite time window), the process returns to 602, with the identification token 104 again enabled and on the user's wrist.

From previous discussion, it will be understood that in some embodiments the action of placing the identification token 104 on the docking station 106 may be replaced with the actions of establishing a communication channel between the personal computer 110 and the identification token 104 and transmitting a re-authentication signal from the personal computer 110 to the identification token 104.

Figure 7:
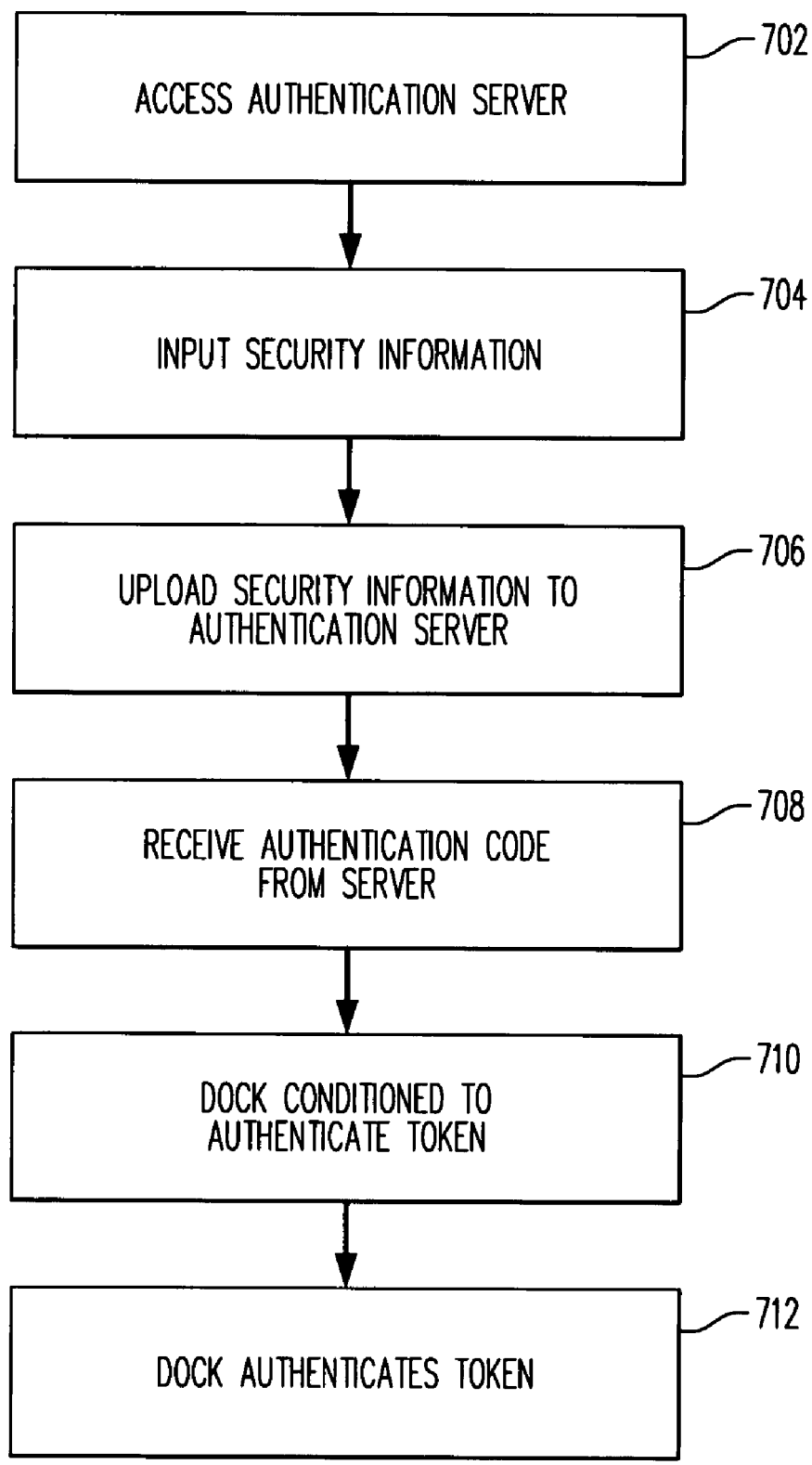
FIG. 7 is a flow chart that illustrates a process for using, in accordance with some embodiments, the docking station of FIG. 3 and a personal computer shown in FIG. 1.

FIG. 7 is a flow chart that illustrates a process that may be performed in the payment system 100, and is more particularly concerned with interactions among the authentication server 116, the personal computer 110, and the docking station 106. Essentially the process of FIG. 7 is concerned with measures intended to provide reasonable assurance that the docking station 106 is used to authenticate the identification token 104 only by the authorized holder of the identification token 104.

As an example of activities that may be prerequisites to the process of FIG. 7, the issuer may send the identification token 104 and the docking station 106 to the authorized user of the identification token 104. By a separate mailing or by another communication channel, the issuer may communicate a PIN to the user, with instructions for the user to connect the docking station 106 to the user's personal computer 110 and to then access a website hosted by the authentication server 116. The user then points the browser of the personal computer 110 to the web address of the authentication server 116 to access the authentication server 116, as indicated at 702 in FIG. 7. The user may then be prompted to download the application 114 from the authentication server 116 to the personal computer 110. At 704, and in response to a webpage downloaded from the authentication server 116 to the personal computer 110, the user enters, into the personal computer 110, the user's name and/or payment account number and the PIN and/or other information by which the user can confirm to the authentication server 116 that the personal computer 110 is being operated by, and under the custody and control of, the authorized user of the identification token 104. This information may be considered to be "security information". At 706, the security information is uploaded from the personal computer 110 to the authentication server 116. Assuming that the authentication server 116 is able to confirm that the security information is valid, the authentication server 116 may then download to the personal computer 110 a suitable code or other message for the personal computer 110 to demonstrate to the docking station 106 that the personal computer 110 is considered to be "trusted" by the authentication server 116. This code or message may be referred to as "authentication information". Receipt of the authentication information by the personal computer 110 is indicated at 708 in FIG. 7.

In some embodiments, secure communication techniques, such as public key encryption and/or digital signatures may be employed to prevent forgery of the authentication information. In addition or alternatively, the user's payment account number and/or a unique identifier for the docking station 106 may be used to generate the authentication information.

At 710 in FIG. 7, the personal computer 110 transmits the authentication information to the docking station 106 to place the docking station 106 into a mode in which it will transmit an authentication signal (as indicated at 712) to the identification token 104 upon the identification token 104 being placed on the docking station 106. In some embodiments, the docking station 106 may remain indefinitely in the mode to authenticate the identification token 104. In other embodiments, the docking station 106 may exit from that mode after a fixed period of time (say 30 days), at which time the process of steps 702-712 may need to be repeated to place the docking station 106 back in that mode. In addition or alternatively, the docking station 106 may automatically exit from the authentication mode upon being disconnected from the personal computer 110. If the data communication channel between the personal computer 110 and the docking station 106 is by wireless communication, the docking station 106 may periodically (say once a day or every hour or every few hours) reconfirm that it remains within communication range relative to the personal computer 110, and if such is no longer the case, the docking station 106 may automatically exit from the authentication mode.

It may be advantageous to allow an authorized user to re-authenticate the identification token 104 in a manner other than placing the identification token 104 on the docking station 106 at the user's home. For example, it may be desirable to provide for a situation in which the user happens to remove the identification token 104 from her/his wrist during the course of the day (or in the evening while on vacation or during a business trip), and thereafter, before returning home, the user wishes to engage in a purchase transaction using the identification token 104. To accommodate contingencies of this sort, a payment card association or a financial services network of another sort may provide a network of kiosks (not shown; possibly also functioning as or co-located with ATMs) for use by the users of identification tokens to re-authenticate identification tokens away from home. Each kiosk may include a proximity read/write device to exchange communications with the identification token presented for re-authentication. Each kiosk may also include a user interface and data communication capabilities to allow the user to access the authentication server of the issuer of the identification token. The user may also enter a PIN and/or other information at the kiosk to confirm the user's identity to the authentication server. In response, the authentication server may download authentication information (e.g., a suitable code) to be communicated from the kiosk to the identification token to re-authenticate the identification token.

The payment system 100 as described above may bring with it a number of advantages. The provision of an "authenticated" identification token for a payment application may enhance security and help to prevent fraudulent transactions. Canceling authentication of the identification token 104 upon removal from the user's wrist may help to prevent unauthorized use of the identification token 104 after loss or theft thereof. At the same time, convenient re-authentication via trusted devices such as the user's own PC 110 and/or a docking station 106 connected to the PC may be relatively secure, while minimizing additional cost or complexity with regard to the identification token 104 itself. It is particularly notable that the payment system 100 described above allows, in effect, for PIN-based security without requiring either (a) a keypad on the identification token 104 to allow PIN entry into the identification token 104, or (b) PIN entry at the point of sale.

Depending on various variations in how the payment system 100 may be operated, it may take a relatively unlikely event, such as the identification token 104 being stolen from the user's residence 108 (possibly at a time when the user 102 is at home but not wearing the identification token 104), and the burglar immediately putting the identification token 104 on his/her wrist, for the security provided by this arrangement to be breached. Thus the security for the identification token 104 may effectively piggy-back on the security generally inherent in a residence with the resident at home. At the same time, it may be quite convenient for the user to take the rather limited actions required to enable/re-authenticate the identification token 104—namely set-up (and possibly occasional renewal of the set-up) when the docking station 106 is first received, and thereafter simply placing the identification token 104 on the docking station 106 at the end of the day. In cases where the battery of the identification token 104 is rechargeable, and the docking station 106 provides a recharging signal, the user receives the additional benefit of indefinitely extended wristwatch battery life as a bonus in return for the user's relatively small effort of habitually placing the identification token 104 on the docking station 106 at the end of the day.

Moreover, as described in some detail below, the relatively secure nature of the identification token 104, and/or the infrastructure that allows identification token 104 to be linked to the user's PC, may allow for advantageous and novel processes in connection with purchase transactions at the point of sale.

Figure 8:
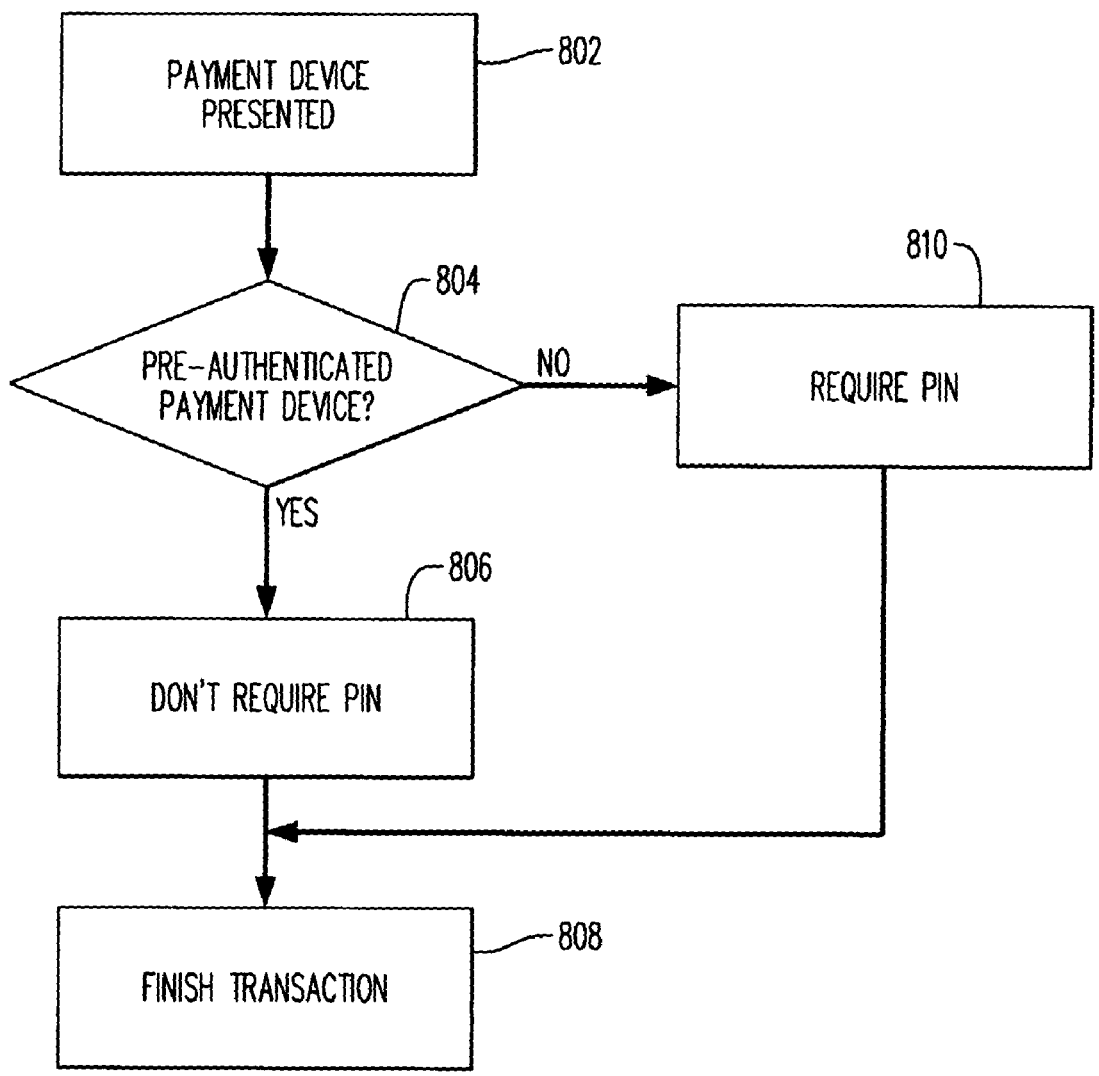
FIG. 8 is a flow chart that illustrates a process that may be performed in accordance with some embodiments in a point of sale (POS) terminal included in the system of FIG. 1.

FIG. 8 is a flow chart that illustrates a process that may be performed in accordance with some embodiments in the POS terminal 122 (FIG. 1) included in the payment system 100.

At 802, the identification token 104 (functioning as a proximity payment device) is presented to the POS terminal 122 to accomplish payment for a purchase transaction at the retail store 120. In accordance (e.g.) with conventional practices, the POS terminal 122 interrogates the identification token 104 via the proximity reader 124, and receives, from the identification token 104 and via the proximity reader 124, identifying information such as the user's payment account number. Moreover, and in accordance with aspects of the present invention, the POS terminal 122 may also receive from the identification token 104, via the proximity reader 124, and as part of the identifying information or as other information, an indication that the identification token 104 is of a class of pre-authenticated identification tokens.

Decision block 804 follows block 802. At decision block 804, the POS terminal 122 determines whether the identification token 104 is in the class of pre-authenticated identification tokens. In accordance with the transaction assumed up to this point, the POS terminal 122 does so determine, and therefore block 806 follows decision block 804. At 806, the POS terminal 122 refrains from requiring the user to enter a PIN into the POS terminal 122 in connection with the transaction. The transaction is then completed in a conventional manner, as indicated by block 808. However, if (contrary to the above assumption) the proximity payment device presented at 802 were not in the class of pre-authenticated devices, then the process of FIG. 8 would branch from decision block 804 to block 810. At block 810, the POS terminal 122 requires the holder of the proximity payment device to enter a PIN for the transaction to go forward. Thus, the pre-authenticated nature of the identification token 104 may allow for streamlined purchase transactions, thereby providing a benefit both to the user 102 and to the retail store 120.

It is to be understood that the process illustrated in FIG. 8 and described above may be implemented by suitable programming of the POS terminal 122. As is generally the case, the POS terminal 122 includes and is controlled by a microprocessor (not separately shown) or similar device, and program memory (also not separately shown) is associated with the microprocessor to store software/firmware that programs the microprocessor.

Figure 9:
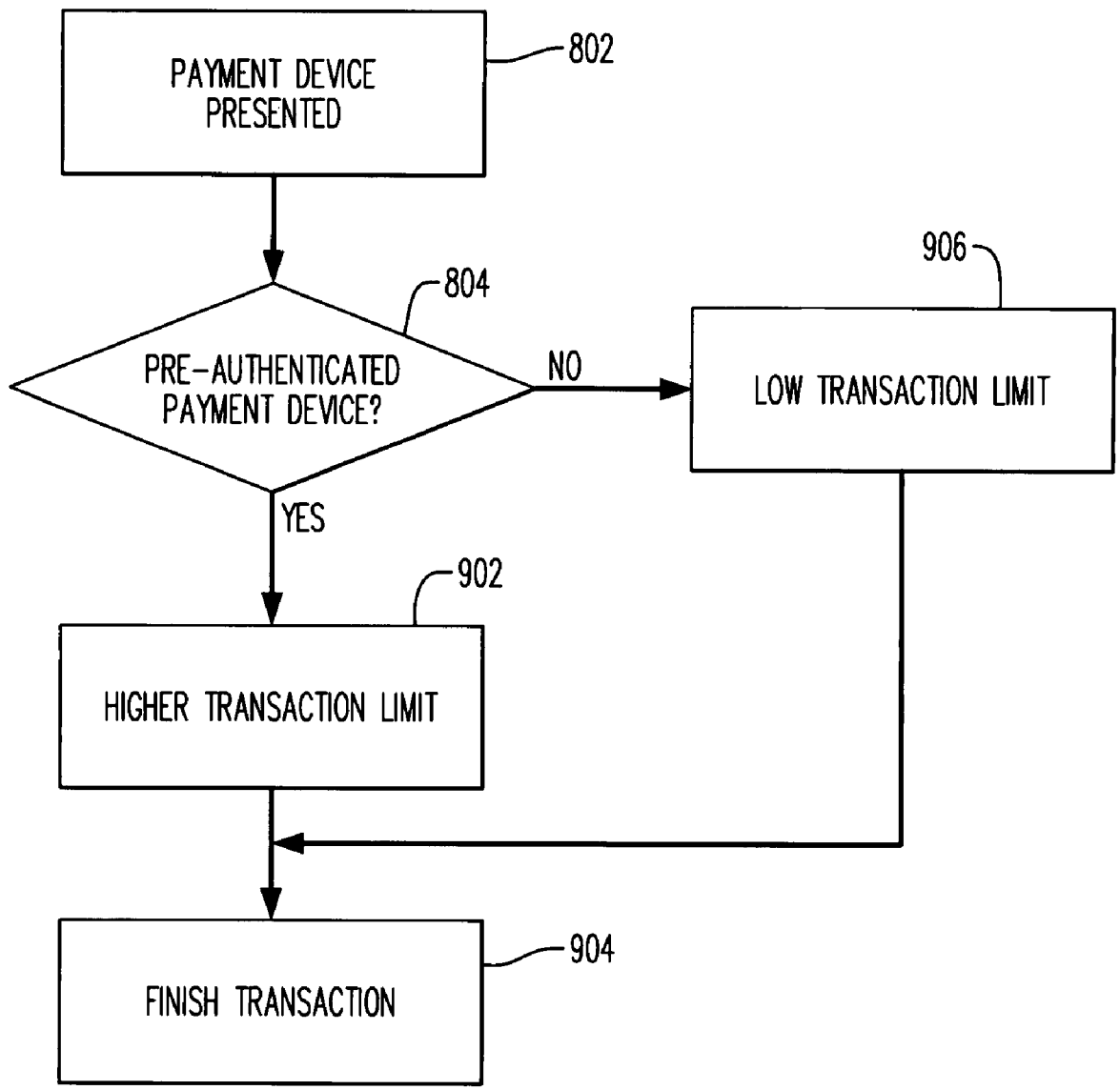
FIG. 9 is a flow chart that illustrates another process that may be performed in accordance with some embodiments in the POS terminal.

FIG. 9 is a flow chart that illustrates another process that may be performed in accordance with some embodiments in the POS terminal 122.

The process of FIG. 9 begins with the same two blocks 802, 804 described immediately above in connection with FIG. 8. As in connection with the process of FIG. 8, it is initially assumed for the purposes of FIG. 9 that a pre-authenticated identification token 104 is presented to the POS terminal 122. In line with this assumption, at decision block 804 in FIG. 9, the POS terminal 122 determines that the identification token presented at 802 in FIG. 9 is in the class of pre-authenticated identification tokens. Therefore, block 902 would follow block 804 in FIG. 9, in accordance with the assumed transaction. At 902, the POS terminal 122 applies a relatively high dollar amount limit to the transaction, say $50.00, $100.00 or $200.00. Assuming that the current transaction dollar amount is below this limit, the process continues with completion of the transaction as indicated at block 904. However, if contrary to the initial assumption, the proximity device presented at 802 in FIG. 9 were not in the class of pre-authenticated device, then the process of FIG. 9 would branch from decision block 804 to block 906. At block 906, the POS terminal 122 applies a relatively low dollar limit to the transaction, say $20.00. It will be appreciated that according to the process of FIG. 9, the user of the pre-authenticated identification token 104 would be allowed to complete purchase transactions that the user of a non-pre-authenticated proximity payment device would not be allowed to complete. The retail store 120 and/or the issuer may be willing to apply a policy of this nature in view of the relative security against unauthorized use embodied in the identification token 104.

As in the case of FIG. 8, the process of FIG. 9 may be implemented with suitable programming of the POS terminal 122. It should also be noted that the features of both processes could be implemented in a single embodiment of the POS terminal 122. According to other embodiments, the decisions made in either or both of the processes could be made at the level of the issuer's authorization server (not separately shown) rather than at the POS terminal. According to still other embodiments, one or both decisions could be made at the level of a merchant processing system (not shown) to which the POS terminal 122 is coupled.

Figure 10:
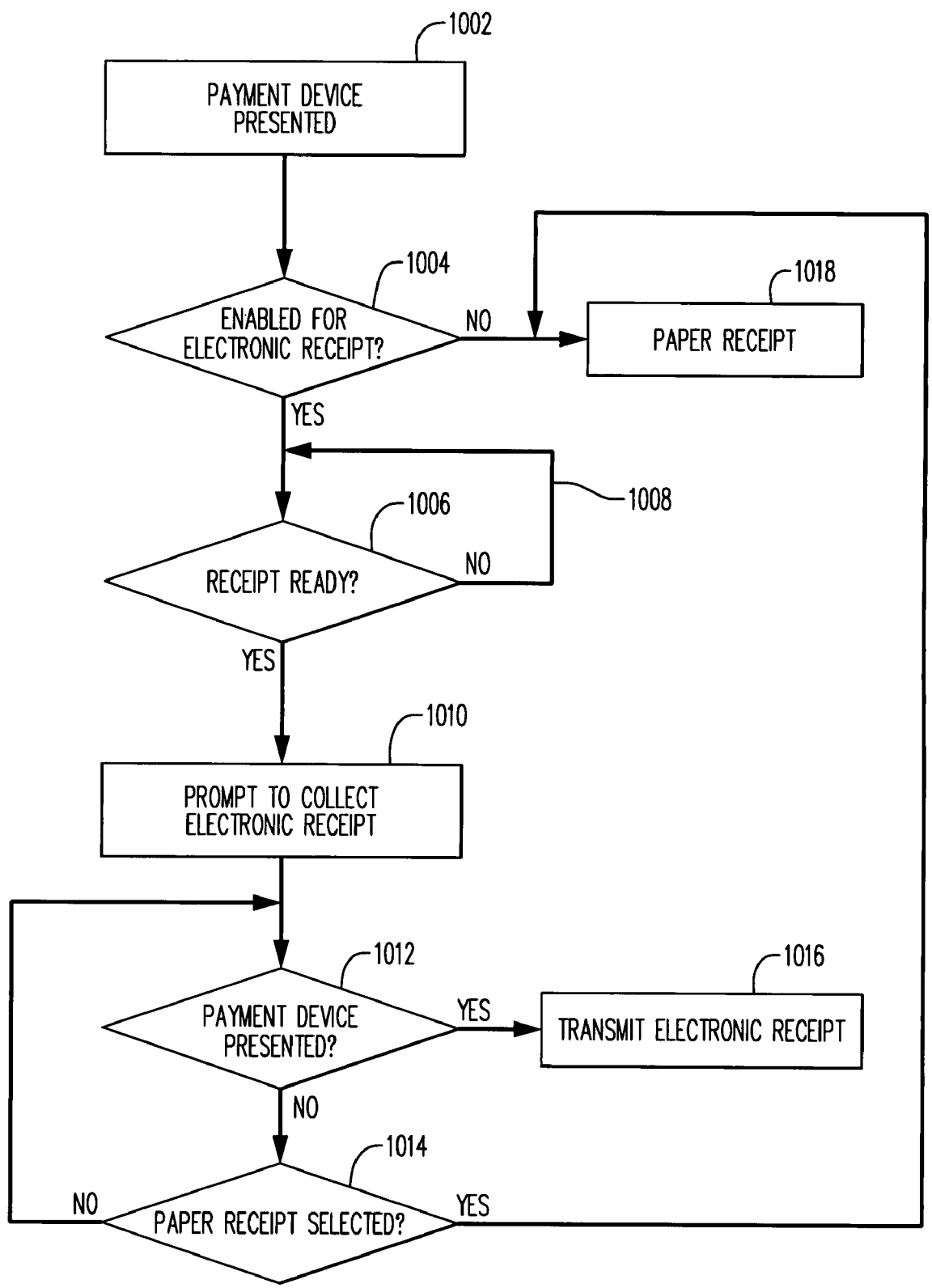
FIG. 10 is a flow chart that illustrates still another process that may be performed in accordance with some embodiments in the POS terminal.

FIG. 10 is a flow chart that illustrates still another process that may be performed in accordance with some embodiments in the POS terminal 122.

A further enhancement to the payment system 100 would take advantage of optional capabilities of the identification token 104 and the docking station 106 to implement a system for paperless electronic receipts for purchase transactions. FIG. 10 is exemplary of a process to be performed at the POS terminal 122 to selectively provide paper receipts or paperless electronic receipts, depending on the capabilities of the proximity payment device which initiates a purchase transaction.

At 1002 in FIG. 10, the identification token 104 is presented to the POS terminal 122 to accomplish payment for a purchase transaction at the retail store 120. The identification token 104 may, for example, be presented to the POS terminal 122 by tapping the identification token 104 on the proximity reader 124 that is coupled to the POS terminal 122. It will be assumed initially for purposes of this example that the identification token 104 is configured to receive from the POS terminal 122 an electronic (paperless) receipt for the purchase transaction. (It need not be the case that all pre-authenticated identification tokens used in the payment system 100 are electronic-receipt-capable—some may be electronic-receipt-capable in some embodiments, others may not. In other embodiments, all pre-authenticated identification tokens may be electronic-receipt-capable; in still other embodiments, none are.) In accordance (e.g.) with conventional practices, the POS terminal 122 interrogates the identification token 104 via the proximity reader 124, and receives, from the identification token 104 and via the proximity reader 124, identifying information such as the user's payment account number. Moreover, and in accordance with aspects of the present invention, the POS terminal 122 may also receive from the identification token 104, via the proximity reader 124, an indication that the identification token 104 is electronic-receipt-capable. This indication may be received as part of the identifying information or separate therefrom. In some embodiments, the POS terminal 122 may separately query the identification token 104 as to whether the identification token 104 is electronic-receipt-capable. It may be necessary or advisable to modify conventional proximity payment device communication protocols (such as the above-referenced PayPass standard) to accommodate providing electronic purchase transaction receipts to proximity payment device holders.

Decision block 1004 follows block 1002. At decision block 1002, the POS terminal 122 determines whether the identification token 104 is electronic-receipt-capable. The POS terminal 122 may make this determination, for example, based on information provided from the identification token 104 or based on a failure on the part of the identification token 104 to respond, or to respond positively, to a query from the POS terminal 122. In accordance with the transaction assumed up to this point in connection with FIG. 10, the POS terminal 122 determines that the identification token 104 is electronic-receipt-capable, and therefore decision block 1006 follows decision block 1004. At decision block 1006, the POS terminal 122 determines whether it is now ready to provide a receipt for the purchase transaction. As a practical matter, the point in time at which the POS terminal 122 is ready to provide the receipt may be delayed by several seconds or more after the identification token 104 is initially tapped on the proximity reader 124 to present the identification token 104 to the POS terminal 122. For example, after the POS terminal 122 receives the user's payment account number from the identification token 104, the POS terminal 122 may need to send an authorization request to the authorization system 130 and to receive back a response to the authorization request. It may be that the POS terminal 122 is able to complete the purchase transaction and to issue the receipt only after it receives the authorization response. The process of FIG. 10 may idle, as indicated at 1008, until the POS terminal 122 is ready to issue the transaction receipt.

Once the POS terminal 122 is ready to issue the receipt, block 1010 may follow decision block 1006. At block 1010, the POS terminal 122 may provide an indication to the user (as shown in FIG. 1 at 102a) that the user should again present the identification token 104 to the proximity reader 124 so that the identification token 104 may receive the electronic receipt for the transaction. The indication may be thought of as prompting the user to present the identification token 104 to the proximity reader 124. The indication may take the form of illuminating an indicator lamp (not shown, may be an LED, for example) on the proximity reader 124 and/or on the POS terminal 122. Alternatively, the indication may take the form of displaying a verbal message such as "Tap payment device on reader to collect receipt" on a display (not shown) provided on the proximity reader 124 or on the POS terminal 122. The POS terminal 122/proximity reader 124 may also present the user 102a with an option to request a paper receipt (e.g., by displaying a suitable legend next to a hard or soft button available for the user to press).

Following block 1010 is a loop made up of decision blocks 1012 and 1014. At decision block 1012, the POS terminal 122 determines whether the identification token 104 has again been presented to (e.g., tapped on) the proximity reader 124 to receive the electronic receipt in the identification token 104. If so, then as indicated at 1016 the POS terminal 122/proximity reader 124 transmits the electronic receipt to the identification token 104. The transmission is performed wirelessly and is received in the identification token 104 via the antenna 226 (FIG. 2). The electronic receipt may, but need not, contain in the form of electronic data any or all of the information customarily printed on a paper receipt for a payment card purchase transaction. Other types of information not customarily printed on a paper purchase transaction receipt may also be included in the electronic receipt.

At decision block 1014, the POS terminal 122 determines whether the user 102a has requested a paper receipt. If so, then as indicated at 1018 the POS terminal 122 prints out a paper receipt for the purchase transaction.

In some embodiments, the loop 1012-1014 may time out if the POS terminal 122 does not determine that either the condition of decision block 1012 or the condition of decision block 1014 is satisfied within a predetermined period of time after the prompt at 1010. In the event that the loop 1012-1014 times out, block 1018—printing of a paper receipt—may be performed as a default measure. Moreover, if the POS terminal 122 determines at decision block 1004 that the proximity payment device presented for the purchase transaction is not electronic-receipt-capable (whether or not it is pre-authenticated), then block 1018 is performed.

As in the case of the processes of FIGS. 8 and 9, the process of FIG. 10 may be implemented by suitably programming a POS terminal. It will be appreciated that the electronic receipt system referred to herein may also call for suitable operations of the docking station 106 and the personal computer 110 to upload the electronic purchase transaction receipt data from the identification token 104 to the personal computer 110. This latter set of operations may be akin to synchronizing files on a PC with those of a PDA docked to the PC. In some embodiments, however, it may be desirable for the electronic purchase transaction receipt data to be erased from the identification token 104 once it has been uploaded to the PC 110. Whether this is done may depend at least in part on the data storage capabilities of the identification token 104.

The electronic receipt system referred to above may provide benefits for the user of the identification token 104 in that storage and retrieval of the receipt data on and from the user's PC may prove to be more convenient than storage and review of paper receipts. Issuing an electronic receipt at the POS terminal in lieu of printing a paper receipt may also tend to streamline purchase transactions.

In some embodiments, the user 102 may be able to download payment account statements to PC 110 and PC 110 may automatically compare and reconcile payment account data with the electronic receipt data uploaded to the PC 110 from the identification token 104.

For the most part, up to this point, use of the pre-authenticated identification token has been described in the context of a payment system application. Nevertheless, in other embodiments of the invention, a pre-authenticated identification token may be applied for other identification applications. For example, a pre-authenticated identification token of the type described above—disabled on removal from the user's wrist/re-enabled through interaction with the user's PC and/or docking station—may be used to access a building, a room or other restricted area by interaction with a proximity reader. In another application, a pre-authenticated identification token may be used to access information for which access is limited (e.g., may be required to log-in to a computer system). Other applications to which a pre-authenticated identification token of this type may be applied include transit systems, RFID-enabled travel documents, or other identification applications. "Identification token" should be understood to include any RF device that transmits an account number or any other identifying information for any purpose. In some embodiments, the identification token may be a stored value payment device, and need not identify the holder or an account which belongs to the holder.

In some applications other than payment, pre-authenticated identification tokens may be accorded privileges not accorded to non-pre-authenticated identification tokens. For example, pre-authenticated identification tokens may allow access to rooms or facilities not open to non-pre-authenticated tokens, or may allow access to levels of information not provided to holders of non-pre-authenticated identification tokens.

In the particular example illustrated herein, the identification token is integrated with a wristwatch. However, this need not be the case, and the identification token may instead be embodied in a wristband that does not include wristwatch functionality.

As used herein and/or in the appended claims, the term "interrogation signal" refers to a signal that an identification token is programmed and/or configured to receive to cause the identification token to transmit identification information or to commence a procedure which results in the identification token transmitting identification data.

As used herein and/or in the appended claims, the term "proximity payment device" refers to a contactless smart card or other RF enabled device that is capable of transmitting a payment account number to a POS terminal and/or to a proximity reader as part of a purchase transaction.

As used herein and/or in the appended claims, the term "re-enabling device" refers to a docking station as described above and/or to a personal computer or any other device that transmits a signal to switch an identification token from a disabled state to an enabled state.

In some embodiments, the identification token 104, in addition to including an optional LED 238 to indicate whether or not the identification token is enabled, may also include a second LED (not shown) to indicate whether or not an "on" switch (not shown) is engaged or has recently been engaged.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. An identification token, comprising:
a housing;
a band for securing the housing to a user's wrist; and
a processor for executing computer program instructions stored on a computer readable medium to perform the following steps:
sensing attachment of the identification token to a user's wrist;
sensing removal of the identification token from the user's wrist;
detecting the removal of the identification token from the user's wrist;
switching the identification token from an enabled state to a disabled state in response to detecting the removal of the identification token;
receiving a signal from a re-enabling device, with the identification in proximity to the re-enabling device, the identification token in its disabled state when the identification token receives said signal, said signal received at a time when the identification token is not on the user's wrist;
sensing re-attachment of the identification token to the user's wrist within a predetermined time after receiving said signal; and
switching the identification token switching back to the enabled state in response to the identification token being re-attached to the user's wrist within said predetermined time after receiving the signal.

2. The identification token of claim 1, wherein said signal is not an interrogation signal.

3. The identification token of claim 1, further comprising:
a battery in said housing; and
means for receiving a power signal from a electronic device and using said power signal to charge said battery.

4. The identification token of claim 1, wherein the identification token is a wristwatch.

5. The identification token of claim 1, wherein the identification token further comprises:
the band further comprising two straps that are attached to opposite sides of the housing and are adapted to be selectively coupled to each other; and
means for detecting that the two straps are not coupled to each other.

6. The identification token of claim 1, wherein the identification token is a proximity payment device.

7. The identification token of claim 1, further comprising:
an antenna coupled to a transmitting device and to a state-switching device.

8. The identification token of claim 1, further comprising:
a USB port on said housing.

9. The identification token of claim 1, further comprising:
an indicator on said housing, said indicator for indicating to the user whether or not the identification token is in said first state.

10. The identification token of claim 9, wherein said indicator is a light-emitting diode.

11. A method of operating a physical identification token, the method comprising:
sensing, by a sensing device, attachment of the identification token to a user's wrist;

sensing, by the sensing device, removal of the identification token from the user's wrist;

detecting, by the identification token, the removal of the identification token from the user's wrist;

switching, by a switching device, the identification token from an enabled state to a disabled state in response to detecting the removal of the identification token;

receiving, in the identification token, a signal from a re-enabling device, with the identification in proximity to the re-enabling device, the identification token in its disabled state when the identification token receives said signal, said signal received at a time when the identification token is not on the user's wrist;

sensing, by the sensing device, re-attachment of the identification token to the user's wrist within a predetermined time after receiving said signal switching, by the switching device, the identification token back to the enabled state in response to the identification token being re-attached to the user's wrist within said predetermined time after receiving the signal.

12. The method of claim 11, further comprising:

the identification token receiving a power signal from the re-enabling device; and the identification token using the power signal to charge a battery included in the identification token.

13. The method of claim 11, wherein the identification token is a wristwatch.

14. The method of claim 11, wherein the identification token is a proximity payment device.

15. The method of claim 11, wherein the sensing removal of the identification token from the user's wrist includes sensing that one portion of a wristband has been uncoupled from another portion of the wristband.

16. The method of claim 11, wherein the re-enabling device is in data communication with a personal computer located in the user's residence.

17. The method of claim 16, further comprising:

the user operating the personal computer to perform an authentication procedure to cause the personal computer to send an authentication signal to the re-enabling device.

18. The method of claim 17, wherein the authentication procedure includes the personal computer exchanging data communication with a server computer that is remotely located from the personal computer.

19. The method of claim 18, wherein the authentication procedure includes the personal computer transmitting, to the server computer, information input into the personal computer by the user.

\* \* \* \* \*

UNITED STATES PATENT AND TRADEMARK OFFICE
CERTIFICATE OF CORRECTION

PATENT NO. : 7,742,995 B2
APPLICATION NO. : 11/728224
DATED : June 22, 2010
INVENTOR(S) : Simon Phillips It is certified that error appears in the above-identified patent and that said Letters Patent is hereby corrected as shown below:

In the Claims:

Claim 1 should read

1. An identification token, comprising:
   a housing;
   a band for securing the housing to a user's wrist; and
   a processor for executing computer program instructions stored on a computer readable medium to perform the following steps:
   sensing attachment of the identification token to a user's wrist;
   sensing removal of the identification token from the user's wrist;
   detecting the removal of the identification token from the user's wrist;
   switching the identification token from an enabled state to a disabled state in response to detecting the removal of the identification token;
   receiving a signal from a re-enabling device, with the identification <u>token</u> in proximity to the re-enabling device, the identification token in its disabled state when the identification token receives said signal, said signal received at a time when the identification token is not on the user's wrist;
   sensing re-attachment of the identification token to the user's wrist within a predetermined time after receiving said signal; and
   switching the identification token switching back to the enabled state in response to the identification token being re-attached to the user's wrist within said predetermined time after receiving the signal.

Signed and Sealed this

Seventeenth Day of August, 2010

David J. Kappos
*Director of the United States Patent and Trademark Office*

CERTIFICATE OF CORRECTION (continued)
U.S. Pat. No. 7,742,995 B2

Claim 11 should read

11. A method of operating a physical identification token, the method comprising:
    sensing, by a sensing device, attachment of the identification token to a user's wrist;
    sensing, by the sensing device, removal of the identification token from the user's wrist;
    detecting, by the identification token, the removal of the identification token from the user's wrist;
    switching, by switching, the identification token from an enabled state to a disabled state in response to detecting the removal of the identification token;
    receiving, in the identification token, a signal from a re-enabling device, with the identification <u>token</u> in proximity to the re-enabling device, the identification token in its disabled state when the identification token receives said signal, said signal received at a time when the identification token is not on the user's wrist;
    sensing, by sensing device, re-attachment of the identification token to the user's wrist within a predetermined time after receiving said signal switching, by the switching device, the identification token back to the enable state in response to the identification token being re-attached to the user's wrist within said predetermined time after receiving the signal.

UNITED STATES PATENT AND TRADEMARK OFFICE
CERTIFICATE OF CORRECTION

PATENT NO. : 7,742,995 B2  Page 1 of 2
APPLICATION NO. : 11/728224
DATED : June 22, 2010
INVENTOR(S) : Simon Phillips It is certified that error appears in the above-identified patent and that said Letters Patent is hereby corrected as shown below:

In the Claims:
Column 18, lines 8-35, Claim 1 should read
1. An identification token, comprising:
 a housing;
 a band for securing the housing to a user's wrist; and
 a processor for executing computer program instructions stored on a computer readable medium to perform the following steps:
 sensing attachment of the identification token to a user's wrist;
 sensing removal of the identification token from the user's wrist;
 detecting the removal of the identification token from the user's wrist;
 switching the identification token from an enabled state to a disabled state in response to detecting the removal of the identification token;
 receiving a signal from a re-enabling device, with the identification <u>token</u> in proximity to the re-enabling device, the identification token in its disabled state when the identification token receives said signal, said signal received at a time when the identification token is not on the user's wrist;
 sensing re-attachment of the identification token to the user's wrist within a predetermined time after receiving said signal; and
 switching the identification token switching back to the enabled state in response to the identification token being re-attached to the user's wrist within said predetermined time after receiving the signal.

This certificate supersedes the Certificate of Correction issued August 17, 2010.

Signed and Sealed this

Fourteenth Day of September, 2010

David J. Kappos
*Director of the United States Patent and Trademark Office*

CERTIFICATE OF CORRECTION (continued)
U.S. Pat. No. 7,742,995 B2

Column 18, line 64 – Column 19, line 20, Claim 11 should read

11. A method of operating a physical identification token, the method comprising:
    sensing, by a sensing device, attachment of the identification token to a user's wrist;
    sensing, by the sensing device, removal of the identification token from the user's wrist;
    detecting, by the identification token, the removal of the identification token from the user's wrist;
    switching, by switching, the identification token from an enabled state to a disabled state in response to detecting the removal of the identification token;
    receiving, in the identification token, a signal from a re-enabling device, with the identification <u>token</u> in proximity to the re-enabling device, the identification token in its disabled state when the identification token receives said signal, said signal received at a time when the identification token is not on the user's wrist;
    sensing, by sensing device, re-attachment of the identification token to the user's wrist within a predetermined time after receiving said signal switching, by the switching device, the identification token back to the enable state in response to the identification token being re-attached to the user's wrist within said predetermined time after receiving the signal.